United States Patent
Lin et al.

(10) Patent No.: US 12,453,027 B2
(45) Date of Patent: Oct. 21, 2025

(54) MULTI-PORT DATA ACCESSING DEVICE

(71) Applicant: Kingston Digital Inc., Fountain Valley, CA (US)

(72) Inventors: Yi-Ting Lin, Hsin-Chu (TW); Hsien-Chih Chang, Hsin-Chu (TW); Chang-Hsing Lin, Hsin-Chu (TW); Hao-Yin Lo, Hsin-Chu (TW); Ben Wei Chen, Santa Ana, CA (US)

(73) Assignee: Kingston Digital Inc., Fountain Valley, CA (US)

( * ) Notice: Subject to any disclaimer, the term of this patent is extended or adjusted under 35 U.S.C. 154(b) by 0 days.

(21) Appl. No.: 18/405,532

(22) Filed: Jan. 5, 2024

(65) Prior Publication Data

US 2024/0147646 A1    May 2, 2024

Related U.S. Application Data

(62) Division of application No. 16/817,474, filed on Mar. 12, 2020.

(51) Int. Cl.
*H05K 5/02* (2006.01)
*G06K 19/077* (2006.01)
*H01R 13/502* (2006.01)
*H01R 13/639* (2006.01)

(52) U.S. Cl.
CPC ..... *H05K 5/0278* (2013.01); *G06K 19/07732* (2013.01); *H01R 13/502* (2013.01); *H01R 13/639* (2013.01); *H05K 5/0247* (2013.01)

(58) Field of Classification Search
CPC ............. H05K 5/0278; H05K 5/0247; G06K 19/07732; G06K 19/07733; G06K 19/07728; H01R 13/502; H01R 13/639; H01R 13/44; H01R 24/60; H01R 31/06; H01R 13/447

See application file for complete search history.

(56) References Cited

U.S. PATENT DOCUMENTS

| | | | |
|---|---|---|---|
| 6,890,188 B1 | 5/2005 | Le | |
| 6,926,544 B2* | 8/2005 | Lee | H05K 5/0278 439/147 |
| 7,473,112 B2* | 1/2009 | Zhu | H05K 5/0278 439/142 |

(Continued)

FOREIGN PATENT DOCUMENTS

CN    2696276 Y    4/2005
CN    101727960 A    6/2010

(Continued)

OTHER PUBLICATIONS

Combined Search and Examination Report from GB Application No. 2004001.0 mailed Oct. 25, 2021, 12 pages.

(Continued)

*Primary Examiner* — Anthony M Haughton
*Assistant Examiner* — Theron S Milliser
(74) *Attorney, Agent, or Firm* — Shih IP Law Group, PLLC

(57) ABSTRACT

A portable data accessing device and more particularly the use of multi-port interfaces on a data accessing device disclosed. The multi-port data accessing device includes an inner body, one or a plurality of moving-caps, one or a plurality of grips, a pump-action and one or a plurality of locking/releasing mechanisms.

10 Claims, 8 Drawing Sheets

(56) References Cited

U.S. PATENT DOCUMENTS

| | | | |
|---|---|---|---|
| 7,674,120 B2 | 3/2010 | Morganstern | |
| 7,713,074 B2 | 5/2010 | Poo | |
| 7,778,037 B2* | 8/2010 | Huang | G06K 19/07732 |
| | | | 361/752 |
| 7,990,698 B2 | 8/2011 | Lo | |
| 8,500,467 B2* | 8/2013 | Ni | H05K 5/0278 |
| | | | 439/142 |
| 8,625,270 B2 | 1/2014 | Ni | |
| D711,389 S | 8/2014 | Sun | |
| 9,192,063 B2 | 11/2015 | Lin | |
| 9,215,820 B2 | 12/2015 | Villa-Real | |
| D885,407 S | 5/2020 | Zhou | |
| 2003/0223286 A1* | 12/2003 | Lee | H01R 13/447 |
| | | | 365/200 |
| 2008/0019090 A1* | 1/2008 | Zhu | H05K 5/0278 |
| | | | 361/679.31 |
| 2008/0140902 A1 | 6/2008 | Townsend | |
| 2009/0089496 A1* | 4/2009 | Huang | G06K 19/07732 |
| | | | 711/111 |
| 2009/0190277 A1 | 7/2009 | Hiew et al. | |
| 2011/0237099 A1* | 9/2011 | Ni | G06K 19/07732 |
| | | | 439/142 |
| 2013/0027868 A1 | 1/2013 | Villa-Real | |

FOREIGN PATENT DOCUMENTS

| | | |
|---|---|---|
| CN | 103137178 A | 6/2013 |
| TW | 200918776 A | 5/2009 |
| TW | M504964 U | 7/2015 |

OTHER PUBLICATIONS

TW Office Action dated Dec. 16, 2021 from patent application No. TW110108240, 10 pages, with machine translation.
Office Action from CN Application No. 202110268379.4 mailed Jun. 29, 2023, 9 pages.

* cited by examiner

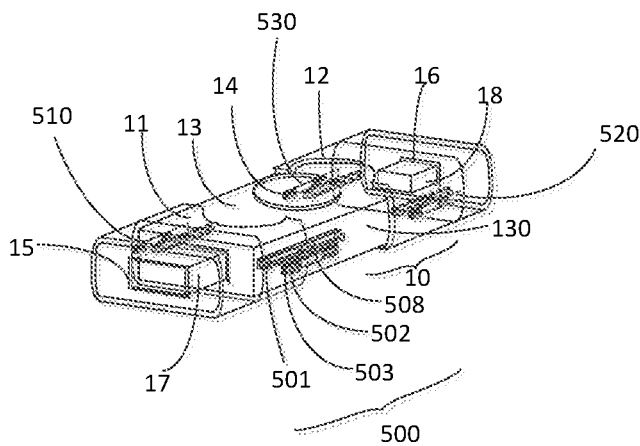
FIG. 5A
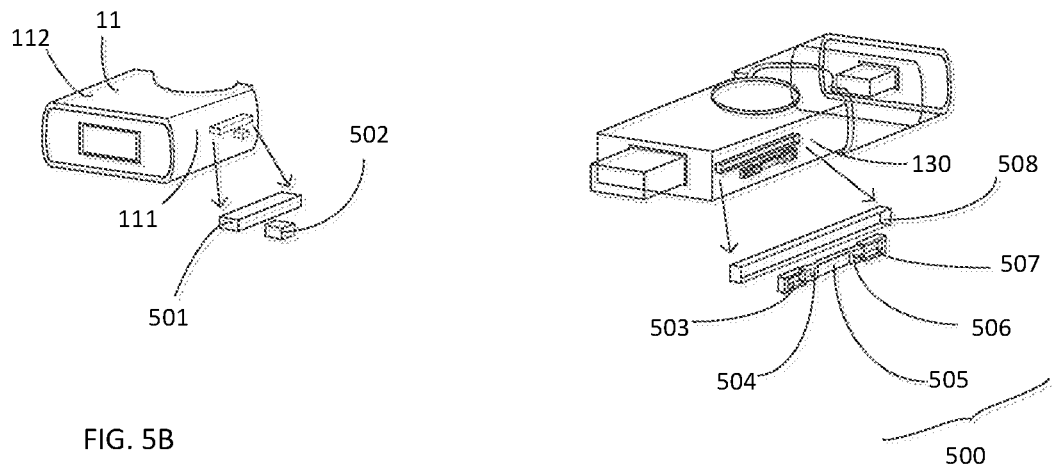
FIG. 5B
FIG. 5C
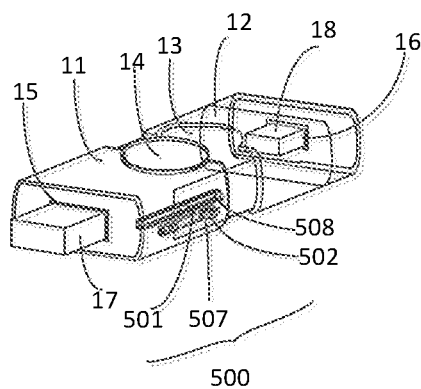
FIG. 5D

MULTI-PORT DATA ACCESSING DEVICE

CROSS-REFERENCE TO RELATED APPLICATION

This application is a Divisional of U.S. application Ser. No. 16/817,474, filed Mar. 12, 2020, which is incorporated herein by reference.

FIELD OF THE INVENTION

The present invention relates generally to portable data accessing devices and more particularly to the use of multi-port data accessing device.

BACKGROUND OF THE INVENTION

Classes of non-volatile semiconductor flash memories, commonly called flash drives, are small hand-held portable data accessing devices that contain a USB interface. The USB interface is inserted during use into a USB receptacle of a host system such as a personal computer (PC), notebook computer, cell phone, tablet and the like. The memory system within the flash drive is electrically connected to the host system through the USB connector for transferring data there between, and the memory system also receives operating power through the USB connector.

As shown in FIGS. 2A-2B, the conventional art utilizes a sliding mechanism with a latch attaching to the inner body that holds the connector interface. The conventional art shows two possible modes, extending or retracting, of operation of the connector in use. The data accessing device 10 consists of a connector A 17, an outer shell 11, an inner body 13, a sliding latch 19, a door 15, and a device body (not shown). The mode changing is made possible by releasing the latch 19 which is associated with the inner body 13 and sliding the inner body 13 between extending or retracting positions. The outer shell 11 remains steady during mode changing. As shown in FIG. 2A, the latch 19 slides inwards which transforms the connector in retracting mode. As shown in FIG. 2B, the latch slides outwards which transforms the connector in extending mode.

The dominate USB interface of portable data accessing devices has been the USB-A interface for a number of years. As new types of interfaces emerge, such as Lightning, USB-C, Thunderbolt, and others, there grows a need for dual or multi-port interfaces on a data accessing device. Examples of such multi-port products include USB-A/USB-C device, USB-A/Lightning device, USB-C/Thunderbolt device, and many others. The dual interfaces usually are provided in the form of two connectors, such as USB-A connector, Lightning connector, USB-C connector and Thunderbolt connector. While the connectors are exposed while not in use, it is easy for the connectors to be damaged while colliding with other objects or environment. It would be beneficial to have multi-port interfaces on a data accessing device that allows any connector to be able to independently expose itself in an active or operation mode, and independently retract or protect itself in a dormant or inactive mode in order to avoid damage of the connectors.

Accordingly, what is needed is a multi-port interface on a data accessing device that addresses the above identified issues. The present application addresses such a need.

SUMMARY OF THE INVENTION

A multi-port interface on a data accessing device is disclosed.

In one example, the multi-port data accessing device, includes an inner body including a first connector, a second connector, one or a plurality of grips, and one or a plurality of locking/releasing mechanisms; a first moving-cap including a first connector opening; and a second moving-cap including a second connector opening; wherein the first moving-cap slides inwards or outwards along the inner body in response to a first pump-action with help of the grip to release and move the first moving-cap between an extended position and a retracted position to retract or extend, respectively, the first connector through the first connector opening and change a state of the first connector between inactive/dormant and active/operation; wherein the second moving-cap slides inwards or outwards along the inner body in response to a second pump-action with help of the grip to release and move the second moving-cap between an extended position and retracted position to retract or extend, respectively, the second connector through the second connector opening and change a state of the second connector between inactive/dormant and active/operation; wherein the grip assists traction and movement of the first and second moving-caps; wherein a locking/releasing mechanism securely locks the first moving-cap within the multi-port data accessing device in either an active/operation or an inactive/dormant state of the first connector; wherein another locking/releasing mechanism securely locks the second moving-cap within the multi-port data accessing device in either an active/operation or an inactive/dormant state of the second connector.

In another example, a multi-port data accessing device, includes an inner body including a first connector, a second connector, a grip, and a locking/releasing mechanism; and a moving-cap including a first connector opening and a second connector opening; wherein the moving-cap is moveable along the inner body in response to a pump-action with help of the grip to release and move the moving-cap between a first position, a second position, and a third position, the first position including the first connector within the moving-cap in an inactive/dormant state and the second connector within the moving-cap in an inactive/dormant state, the second position including the first connector extended through the first connector opening in an active/operation state and the second connector within the moving-cap in an inactive/dormant state, and the third position including the first connector within the moving-cap in an inactive/dormant state and the second connector extended through the second connector opening in an active/operation state; wherein the grip assists traction and movement of the moving-cap; and wherein a locking/releasing mechanism securely locks the moving-cap of the multi-port data accessing device in one of the first position, second position, and third position.

Additional aspects, advantages and features of the present invention are included in the following description of exemplary examples thereof, which description should be taken in conjunction with the accompanying drawings.

BRIEF DESCRIPTION OF THE DRAWINGS

The accompanying figures illustrate several examples of the invention and, together with the description, serve to explain the principles of the invention. One of ordinary skill in the art readily recognizes that the examples illustrated in the figures are merely exemplary, and are not intended to limit the scope of the present invention.

FIG. 5A shows an example of locking/releasing mechanism corresponding to one of the moving-caps is in place while one of the connectors is in inactive/dormant state of a dual-port data accessing device in accordance with the present invention.

FIG. 5B shows an example of a sliding rib and a locking rib corresponding to a moving-cap incorporated inside the moving-cap of a dual-port data accessing device in accordance with the present invention.

FIG. 5C shows an example of a sliding rail, two sinking holes, two guiding ramps and a guiding track of a locking/releasing mechanism, corresponding to one of the moving-caps incorporated at the side of the inner body of a dual-port data accessing device in accordance with the present invention.

FIG. 5D shows an example of the locking/releasing mechanism corresponding to one of the moving-caps is in place while one of the connectors is in active/operation state of a dual-port data accessing device in accordance with the present invention.

DETAILED DESCRIPTION

Figure 1A:
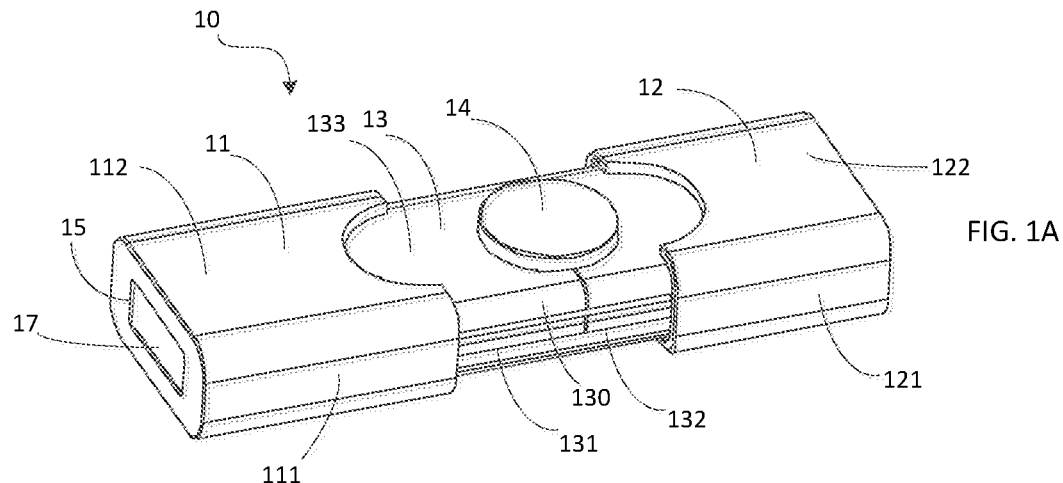
FIG. 1A shows an example of the moving-caps in an extended position of a dual-port data accessing device in accordance with the present invention.

The present invention relates generally to portable data accessing devices and more particularly to the use of multi-port interfaces on a data accessing device. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

A multi-port interface on a data accessing device is disclosed. The multi-port interface on the data accessing device includes an inner body, one or a plurality of moving-caps, one or a plurality of grips, a pump-action and a locking/releasing mechanism. The inner body encloses the connectors/interfaces and other necessary parts of the data accessing device. The moving-caps can pump or move between two extending and retracting positions to correspondingly retract or extend the one or plurality of connectors within the data accessing device. The grip assists the traction and the movement of the moving-caps. The locking mechanism of the corresponding moving-cap securely locks the moving-cap within the data accessing device in either the active/operation or inactive/dormant state of the corresponding connector. A pump-action force on the moving-cap can be applied with the help of the grip to release the moving-cap and change the state of the corresponding connectors between active/operation and inactive/dormant.

An advantage of the present invention with the inner body plus the moving-caps is easier to manufacture and keeping the structure simple and sturdy to withstand external damage to the connectors within. Further, due to the pump-action of the external caps relative to the inner body, the data accessing device in the present invention is more reliable, as there are less moving parts in either mode of operation in extending or retracting of the connectors. Another advantage of the present invention is better reliability of the data accessing device by keeping the inner body steady when sliding the outer shell or the moving-caps which minimizes motion of the data accessing device during extending or retracting of the connectors.

The moving-caps can pump, slide, or move between the extending and retracting positions to correspondingly extend or retract the connectors within the data accessing device. When the corresponding connector is in its dormant state, the corresponding connector is retracted inside the moving-cap. The locking mechanism of the corresponding moving-cap securely locks the moving-cap within the data accessing device. If the connector is intended to be in operation, a pump-action inwards force on the moving-cap may be applied with the help of the grip. The moving-cap is therefore released from the locking position in one of the sinking holes and slides with the help of the sliding rail, guiding ramp and guiding track, toward the alternate locking position in another sinking hole into the next operation state, which extends the corresponding connector. If the connector is intended to be in inactive/dormant state, a pump-action outwards force can be applied with the help of the grip. The moving-cap is therefore released from its locking position in one of the sinking holes and slides with the help of the sliding rail, guiding ramp and guiding track, toward the alternate locking position in another sinking hole into the next operation state, which retracts the corresponding connector.

When one of the connectors is intended to be in inactive or dormant mode, the corresponding moving-cap extends outwards from the inner body, the connector then retracts safely inside the moving-cap to protect it from unintended damage. On the other hand, when one of the connectors is intended to be in active or operation mode, the corresponding moving-cap retracts inwards against the inner body, the connector then extends outside the moving-cap for normal operation. In the case of dual-port data accessing device, it allows the states of its two connectors in all four possible combinations: retracting/retracting, retracting/extending, extending/retracting, and extending/extending. The one or plural number of moving-caps work independently with the assistance of the grip on the data accessing device for better traction. The grip can be in the expression of an action or in physical forms. The grip position can be in the middle of the inner body or on the non-operational moving-cap. The grip can also be in the form of a ridge, groove, button, or valley on the inner body or on the moving-caps, as long as it assists the traction and the movement of the moving-caps.

Figure 1B:
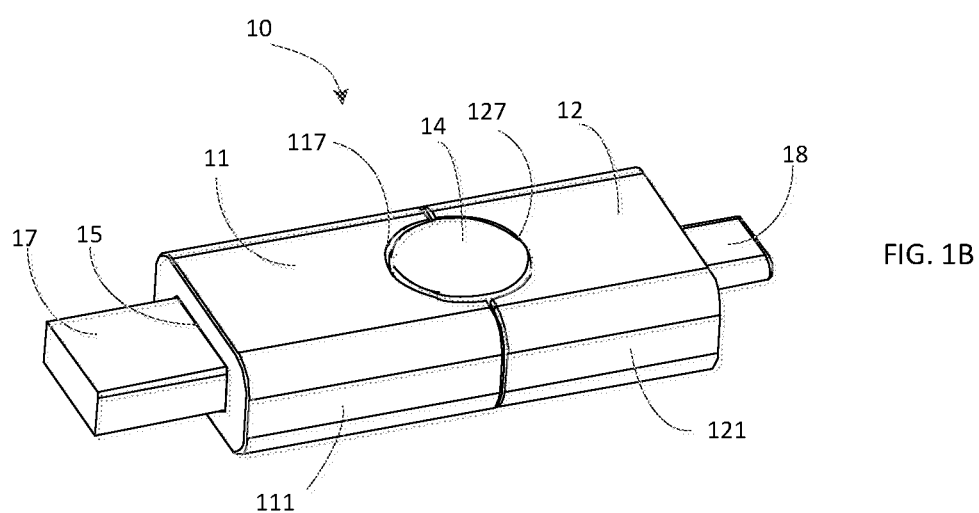
FIG. 1B shows an example of the moving-caps in a retracted position of a dual-port data accessing device in accordance with the present invention.
Figure 2A:
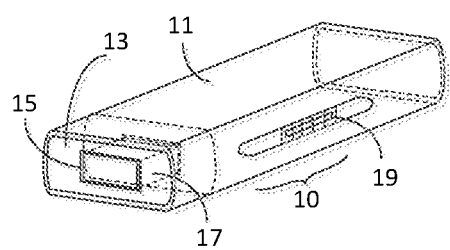
FIGS. 2A-2B shows a conventional combined structure for a portable memory device.
Figure 2B:
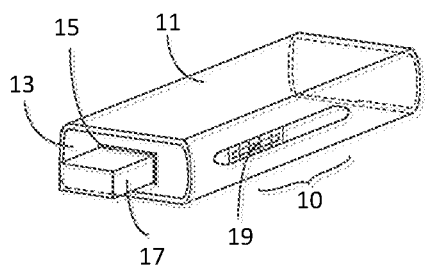

FIGS. 1A and 1B illustrates a dual-port data accessing device 10 that includes an inner body 13, a first moving-cap 11, a second moving-cap 12, a first connector 17, a second connector 18, grips 14, 140 (not shown) where grip 140 is on an opposite side of grip 14 on a top and bottom side of the inner body, a first connector opening 15, and a second connector opening 16 (not shown). Examples of connectors include USB-A/USB-C device, USB-A/Lightning device, and USB-C/Thunderbolt. The first moving-cap 11 includes two side surfaces 111, a top surface 112, a concave end 117 of the top surface 112, a bottom surface 114 (not shown), and a concave end 118 (not shown) of the bottom surface 114 (not shown). The second moving-cap 12 includes two side surfaces 121, a top surface 122, a concave end 127 of the top surface 122, a bottom surface 124 (not shown), and a concave end 128 (not shown) of the bottom surface 124 (not shown). The inner body 13 includes two side surfaces 130 and a top surface 133 and a bottom surface 134 (not shown). The two side surfaces 130 of the inner body 13 are each provided with slide grooves 131 and 132 which allow the first and second moving-caps 11 and 12 to slide along the side surfaces 130 of inner body 13. The dual-port data accessing device also includes a second connector opening 16 that is not shown in these perspectives.

As shown in FIG. 1A, the first moving-cap 11 and second moving-cap 12 of the dual-port data accessing device 10 slide outwards away from the grip 14 to enclose the first connector 17 and second connector 18, respectively, thereby retracting the first connector 17 and second connector 18 within the first moving-cap 11 and second moving-cap 12. The sliding outwards of the first moving-cap 11 and the second moving-cap 12 allows the corresponding first connector 17 and second connector 18 to retract into the corresponding first connector opening 15 and second connector opening 16, which positions both the first connector 17 and second connector 18 to be in an inactive/dormant state.

As shown in FIG. 1B, the first moving-cap 11 and the second moving-cap 12 slides inwards to extend the corresponding first connector 17 and second connector 18. The sliding inwards of the first moving-cap 11 and the second moving-cap 12 allows the corresponding first connector 17 and second connector 18, to extend out of the corresponding first connector opening 15 and second connector opening 16, which positions both first connector 17 and second connector 18 to be in an active/operation state. Further the sliding inwards of the first moving-cap 11 and the second moving-cap 12 allows the concave ends 117, 127 of the top surfaces 112, 122 of the moving-caps 11, 12 to encircle the grip 14, and allows the concave ends 118 (not shown), 128 (not shown) of the bottom surfaces 114 (not shown), 124 of the moving-caps 11, 12 to encircle the grip 140.

Two other exemplary combinations of the pump-action of the moving-caps 11 and 12 retracting/extending and extending/retracting are not shown in FIGS. 1A and 1B, but will be disclosed in more details in FIGS. 3A-3D.

FIGS. 3A-3D, show four exemplary implementations of the first connector 17 and second connector 18 that utilizes the slide or pump-action mechanism to slide inwards the first moving-cap 11 and second moving-cap 12, while keeping the inner body 13 steady, in order to extend the first connector 17 and second connector 18 outwards. Further, the slide or pump-action mechanism may also slide the first moving-cap 11 and second moving-cap 12 outwards, while keeping the inner body 13 steady, in order to retract the first connector 17 and second connector 18 inwards.

When one of the first connector 17 and second connector 18 is intended to be in inactive or dormant mode, the corresponding first moving-cap 11 or second moving-cap 12 extends outwards from the grip 14 of the inner body 13, the selected connector then retracts safely inside the moving-cap to protect the selected connector from unintended damage. On the other hand, when one of the first connector 17 and second connector 18 is intended to be in an active or operation mode, the corresponding moving-cap 11 or second moving-cap 12 slides inwards toward the grip 14 of the inner body 13, and the selected connector then extends outside the moving-cap for normal operation.

Figure 3A:
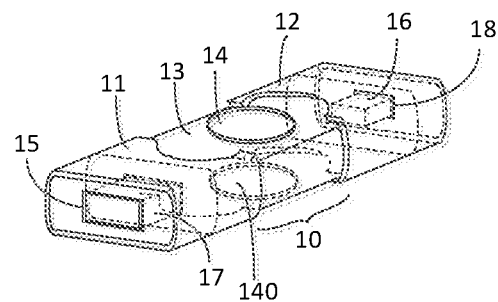
FIG. 3A shows an example of the moving-caps in extended/extended positions of a dual-port data accessing device in accordance with the present invention.
Figure 3B:
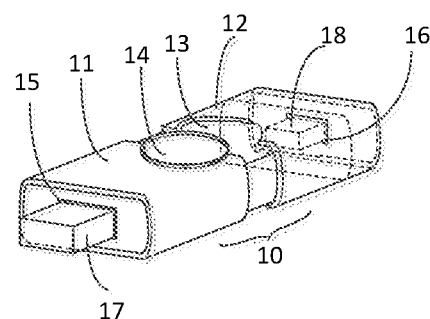
FIG. 3B shows an example of the moving-caps in retracted/extended positions of a dual-port data accessing device in accordance with the present invention.
Figure 3C:
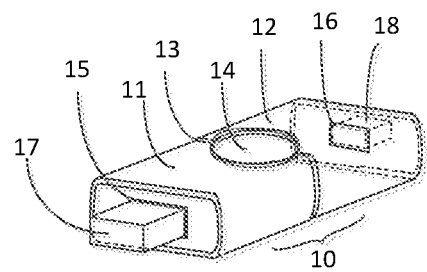
FIG. 3C shows an example of the moving-caps in retracted/retracted positions of a dual-port data accessing device in accordance with the present invention.
Figure 3D:
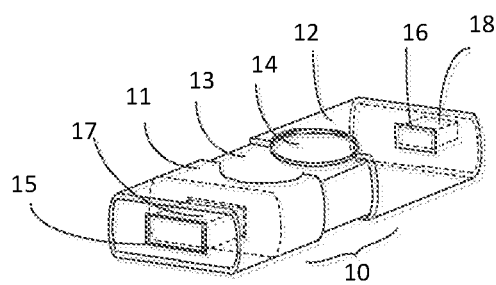
FIG. 3D shows an example of the moving-caps in extended/retracted positions of a dual-port data accessing device in accordance with the present invention.

FIGS. 3A-3D, show four exemplary states of the first connector 17 and second connector 18 of the dual-port data accessing device 10 in all four possible combinations: retracting/retracting as in FIG. 3A, retracting/extending as in FIG. 3B, extending/extending as in FIG. 3C, and extending/retracting as in FIG. 3D. The first moving-cap 11 and second moving-cap 12 work independently with the assistance of the grip 14, 140 (not shown) on the data accessing device 10 for better traction. The grip 14, 140 (not shown) may be in the expression of an action or in physical forms. The grip 14, 140 (not shown) positions may be in the middle of the inner body 13 on opposite sides from each other on a top and bottom side of the inner body, or on a non-operational moving-cap. The grip 14, 140 (not shown) may also be in the form of a ridge, groove, button, or valley on the inner body 13 or on the moving-caps to assist the traction and the movement of the moving-caps.

As shown in FIG. 3A, both first moving-cap 11 and second moving-cap 12 slide outwards which encloses and thereby retracts the first connector 17 and second connector 18 in a retracted mode. In the retracted mode, both of the first connector 17 and second connector 18 remain in dormant or inactive state. With the first moving-cap 11 and the second moving-cap 12 extending outwards from grip 14 to retract the corresponding first connector 17 and second connector 18, the corresponding first connector 17 and second connector 18 are retracted into the corresponding first connector opening 15 and second connector opening 16 to position both connectors 17, 18 in an inactive/dormant state.

As shown in FIG. 3B, the first moving-cap 11 slides inwards which extends the first connector 17 to an extended/active mode. The second moving-cap 12 stays in the outwards position which encloses and thereby retracts the second connector 18 and positions the connector in the retracted/inactive mode. With the first moving-cap 11 sliding inwards to extend the corresponding first connector 17 out through the first connector opening 15, and the second moving-cap 12 sliding outwards to enclose and thereby retract the corresponding second connector 18 through the second connector opening 16 to position the first connector 17 in an active/operation state and the second connector 18 in an inactive/dormant state.

As shown in FIG. 3C, the first moving-cap 11 slides inwards toward grip 14 which places the first connector 17 in an active/operation state. The second moving-cap 12 slides inwards toward grip 14 which places the second connector 18 in an active/operation state. With the first moving-cap 11 and the second moving-cap 12 sliding inwards toward grip 14 to extend the corresponding first connector 17 and second connector 18 out of the corresponding first connector opening 15 and second connector opening 16, places both connectors 17, 18 in an active/operation state.

As shown in FIG. 3D, the first moving-cap 11 slides outwards from the grip 14 which places the first connector 17 in an inactive/dormant state. The second moving-cap 12 slides inwards which places the second connector 18 in an active/operation state. The first moving-cap 11 slides outwards from the grip 14 to retract the corresponding first connector 17 into the corresponding first connector opening 15, and the second moving-cap 12 sliding inwards to the grip 14 to extend the corresponding second connector 18 out of the corresponding second connector opening 16 to position the first connector 17 in an inactive/dormant state and the second connector 18 in an active/operation state.

FIGS. 4A-4D depicts plan views of four exemplary combinations of first connector 17 and second connector 18 in uses.

Figure 4A:
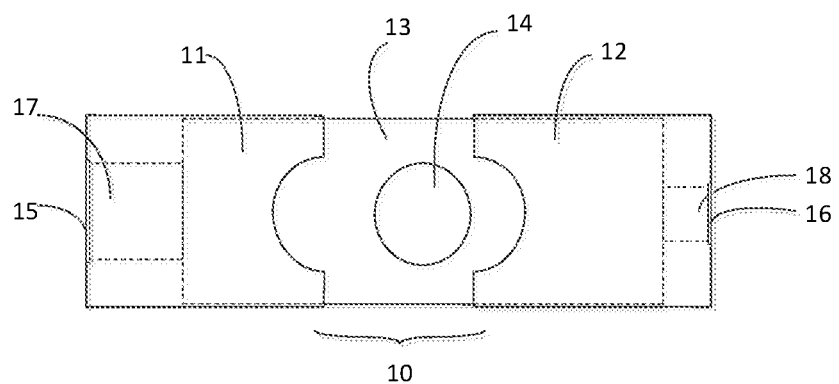
FIG. 4A shows an example of a plan view of the moving-caps in extended/extended positions of a dual-port data accessing device in accordance with the present invention.

As shown in FIG. 4A, both of the first moving-cap 11 and second moving-cap 12 are slid outwards from grip 14 which positions both the first connector 17 and second connector 18 in a retracted mode. Both the first connector 17 and second connector 18 remain in a dormant/inactive state.

Figure 4B:
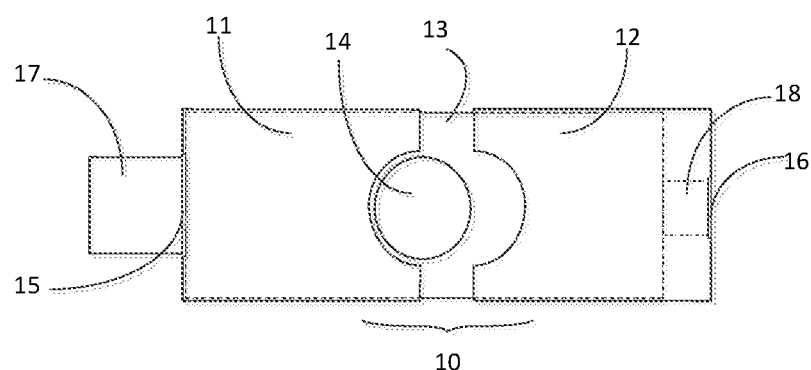
FIG. 4B shows an example of a plan view of the moving-caps in retracted/extended positions of a dual-port data accessing device in accordance with the present invention.

As shown in FIG. 4B, the first moving-cap 11 slides inwards toward grip 14 which positions the first connector 17 in the extended mode. The second moving-cap 12 stays in the outward position which positions the second connector 18 in the retracted mode.

Figure 4C:
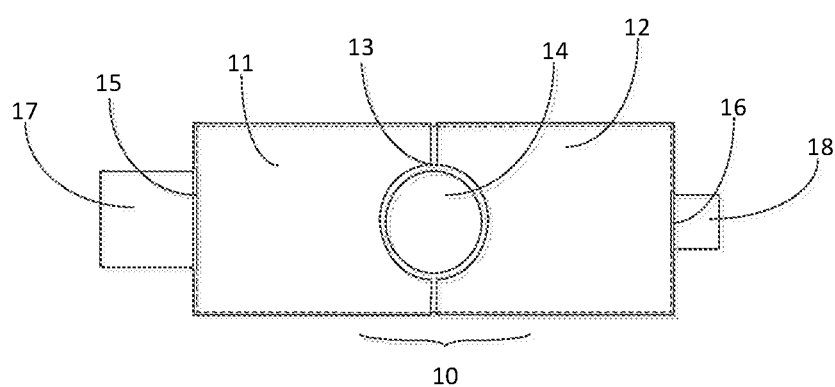
FIG. 4C shows an example of a plan view of the moving-caps in retracted/retracted positions of a dual-port data accessing device in accordance with the present invention.

As shown in FIG. 4C, the first moving-cap 11 slides inwards toward grip 14 which positions the first connector 17 in the extended mode. The second moving-cap 12 slides inwards toward the grip 14 which position the second connector 18 in the extended mode.

Figure 4D:
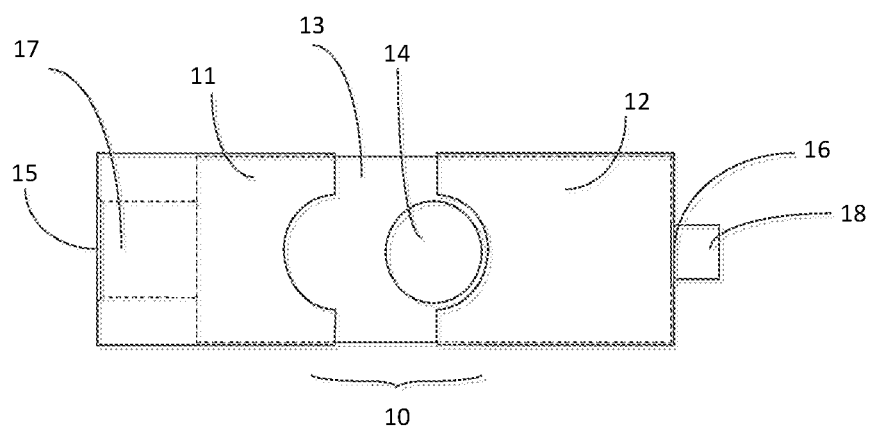
FIG. 4D shows an example of a plan view of the moving-caps in extended/retracted positions of a dual-port data accessing device in accordance with the present invention.

As shown in FIG. 4D, the first moving-cap 11 slides outwards from grip 14 which positions the first connector 17 in the retracted mode. The second moving-cap 12 slides inwards which positions the second connector 18 in the extended mode.

FIGS. 5A-5D illustrates a first set of locking/releasing mechanism 500, 510 (shown in FIG. 5A) and a second set of locking/releasing mechanism 520 (shown in FIG. 5A), 530 (shown in FIG. 5A) of the inner body 13 corresponding to the first moving-cap 11 and second moving-cap 12, respectively.

The first set of locking/releasing mechanism 500, 510 securely locks the first moving-cap 11 of the data accessing device 10 in either the active/operation or inactive/dormant state of the corresponding first connector 17. A pump-action force on the first moving-cap 11 may be applied with the assistance of the grip 14 on the top side of the inner body, 140 (not shown) on the bottom side of the inner body, to release the first moving-cap 11 and change the state of the corresponding first connector 17 between active/operation and inactive/dormant.

The locking and releasing of first moving-cap 11 and second moving-cap 12 via the two sets of locking/releasing mechanism 500, 510, and 520, 530, respectively, work independently with the assistance of the grip 14, 140 (not shown) on the data accessing device 10 for better traction. The grip position may be at or near the middle of the inner body 13 or on a non-operational example of first moving-cap 11 or second moving-cap 12.

A pump-action force on the first moving-cap 11 or second moving-cap 12 may be applied with the help of the grip 14, 140 (not shown). The corresponding first moving-cap 11 or second moving-cap 12 is therefore released from its locking position in one of the sinking holes 503, 507 and slides with the help of the sliding rail 508, as depicted in FIG. 5C, toward the alternate locking position in another sinking hole 507, 503 into the next state, between active and inactive state of the connectors. Further, the example of sinking holes 503, 507 and sliding rail 508 corresponding to the locking/releasing mechanism 500 as depicted in FIG. 5C also applies to the not shown sinking holes and sliding rails corresponding to locking/releasing mechanisms 510, 520, 530.

If one of the first connector 17 or second connector 18 is intended to be active or in operation, a pump-action inwards force on the first moving-cap 11 or second moving-cap 12 is applied with the help of the grip 14, 140 (not shown). The corresponding first moving-cap 11 or second moving-cap 12, is therefore released from its locking position in one of the sinking holes 503, 507 and slides with the help of the sliding rail 508, guiding ramps 504, 506 and guiding track 505, as depicted in FIG. 5C, toward the alternate locking position in the other sinking hole 507, 503 into the next operation state, which extends the corresponding first connector 17 or second connector 18 through the first connector opening 15 or the second connector opening 16, respectively. Further, the example of sinking holes 503, 507, sliding rail 508, guiding ramps 504, 506 and guiding track 505, corresponding to the locking/releasing mechanism 500 as depicted in FIG. 5C also applies to the not shown sinking holes, sliding rails, guiding ramps, and guiding tracks corresponding to locking/releasing mechanisms 510, 520, 530.

If one of the first connector 17 or second connector 18 is intended to be in an inactive/dormant state, a pump-action outwards force on the first moving-cap 11 or second moving-cap 12 is applied with the help of the grip 14, 140 (not shown). The corresponding first moving-cap 11 or second moving-cap 12, is therefore released from its locking position in one of the sinking holes 503, 507, and slides with the help of the sliding rail 508, guiding ramps 504, 506 and guiding track 505, as depicted in FIG. 5C, toward the alternate locking position in the other sinking hole 503 or 507, into the next inactive/dormant state, which retracts the corresponding first connector 17 or second connector 18 through the first connector opening 15 or the second connector opening 16, respectively. Other sets of sinking holes, sliding rails, guiding ramps and guiding tracks corresponding with the other locking/releasing mechanisms 510, 520, 530 are not shown. Further, the example of sinking holes

503, 507, sliding rail 508, guiding ramps 504, 506 and guiding track 505, corresponding to the locking/releasing mechanism 500 as depicted in FIG. 5C also applies to the not shown sinking holes, sliding rails, guiding ramps, and guiding tracks corresponding to locking/releasing mechanisms 510, 520, 530.

As shown in FIG. 5B, the first moving-cap 11 includes first side surfaces 111, a top surface 112, and a bottom surface 114 (not shown). A sliding rib 501 and a locking rib 502 are provided at an inner side of side surface 111 of the first moving-cap 11. Another set of side surface, sliding rib, and locking rib on the opposite side of the first side surface are not shown.

As shown in FIGS. 5A and 5C, the inner body 13 includes first side surfaces 130. Further, a sliding rail 508, sinking holes 503 and 507, and guiding ramps 504 and 506, are provided on the outer side of side surfaces 130 as shown in FIG. 5C. Another set of side surface, sliding rail, sinking holes, and guiding ramps on the opposite side of the first side surface are not shown.

The sliding rib 501 and the locking rib 502 on the first moving-cap 11, mate with the sliding rail 508 and the sinking holes 503 and 507 of the first side surface 130 on the inner body 13. The locking rib 502 and the sinking holes 503 and 507, when removably engaged, contribute to the locking or secure state of the alternate position between the active/operation and the inactive/dormant states of the first connector 17 or second connector 18.

In order to release the first moving-cap 11 from its secure/locking positions in one of the sinking holes 503 or 507, the pump-action force, the grip 14, 140 (not shown) and one of the guiding ramps 504 or 506 are utilized, as shown in FIG. 5A and FIG. 5D.

As shown in FIG. 5A, the first set of locking/releasing mechanism 500, 510 locks the first moving-cap 11 in place while the first connector 17 is in an inactive/dormant state. The locking rib 502 is securely locked in the position associated with the sinking hole 503. The second set of locking/release mechanism 520, 530 are not shown.

As shown in FIG. 5D, the first set of locking/releasing mechanism 500, 510 (not shown) locks the first moving-cap 11 in place while the first connector 17 is in active/operation state. The locking rib 502 is securely locked in the position associated with the sinking hole 507. The second set of locking/release mechanism 520, 530 are not shown.

Although not depicted in FIGS. 1A-1B, 3A-3D, 4A-4D, 6A-6B, 7A-7C, and 8A-8C, it is within the possession of the Applicant, and one of ordinary skill in the art would understand, that the locking/releasing mechanisms as described in FIGS. 5A-5D may also be applied and combined with the dual-port data accessing device of FIGS. 1A-1B, 3A-3D, 4A-4D, 6A-6B, 7A-7C, and 8A-8C in any combination. For example, the dual-port data accessing device may include one or two locking/releasing mechanism per moving-cap, so that there may be one to four locking/releasing mechanisms per dual-port data accessing device.

Figure 6A:
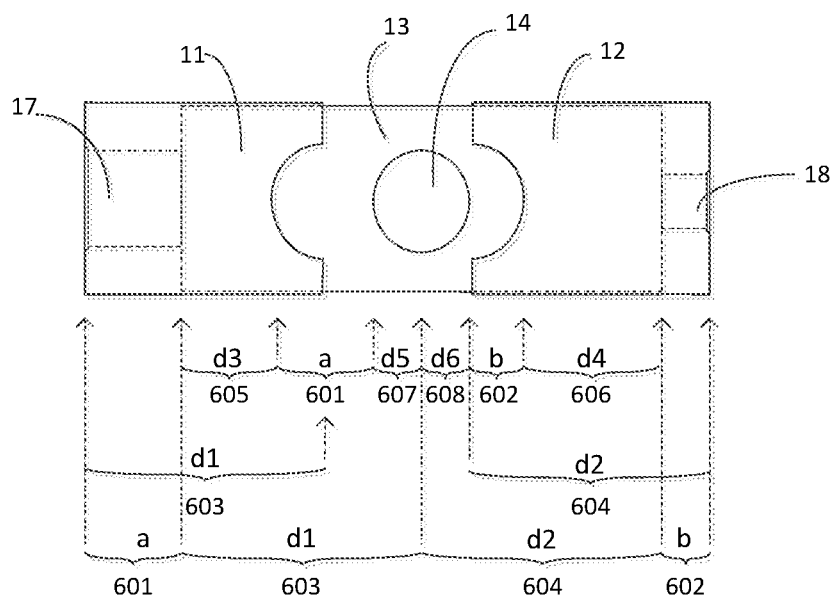
FIG. 6A shows an example of the fully retracting positions of the two connectors relative to the two moving-caps, the grip, and the inner body of a dual-port data accessing device in accordance with the present invention.
Figure 6B:
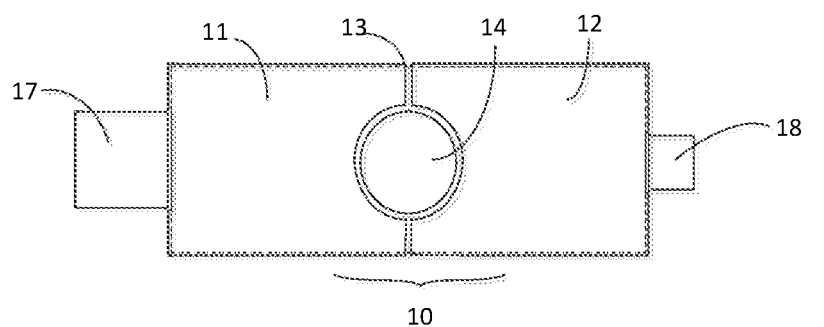
FIG. 6B shows an example of the fully extending positions of the two connectors relative to the two moving-caps, the grip, and the inner body of a dual-port data accessing device in accordance with the present invention.

FIGS. 6A and 6B depict in a plan view of dual-port data accessing device 10 with an exemplary optimal placement for the first moving-cap 11 and second moving-cap 12, relative to the length of the first connector 17 and second connector 18, the length of the inner body 13 and the grip 14, 140 (not shown).

FIG. 6A illustrates in a plan view of the fully retracting positions of the first connector 17 and second connector 18, relative to the first moving-cap 11, second moving-cap 12, the grip 14, and the inner body 13. The length of the first connector 17 is length-a 601. The length of the second connector 18 is length-b 602. The length of the moving-cap 11 is length-d1 603. The length of the second moving-cap 12 is length-d2 604. The grip 14, 140 (not shown) is sandwiched between the first moving-cap 11 and second moving-cap 12. The shape of the physical grip is in complement to the shape of the ends of the first moving-cap 11 and second moving-cap 12. In this example, the grip shape is a circle, however, the grip shape may be any shape which is complementary to the shape of the ends of the first moving-cap 11 and second moving-cap 12 and provide traction for sliding the moving-caps 11, 12. The grip position may be near or in the middle of the inner body 13 or on another moving-cap such that the user may grip on to the another moving-cap which can be either in dormant or operational state, as long as it stays in a locked position. The grip may be in the form of a ridge, groove, button, or valley on the inner body 13 or on the moving-caps, to assist the traction and the movement of the moving-caps.

FIG. 6A further illustrates the following length descriptions of the dual-port data accessing device. Length-d1 603: the length of the first moving cap. Length-d2 604: the length of the second moving cap. Length-a 601: the length of the first connector. Length-b 602: the length of the second connector. Length-d3 605: the distance between the inner end of the first connector and the concave end of the first moving-cap. Length-d4 606: the distance between the inner end of the second connector and the concave end of the second moving-cap. Length-d5 607: the distance between the center of grip and the first convex end of the grip which can mate with the concave end of the first moving-cap. Length-d6 608: the distance between the center of grip and the second convex end of the grip which can mate with the concave end of the second moving-cap. As shown in FIG. 6A, in the fully retracting mode of both moving-caps 11, 12, the distance between the concave end of the first moving-cap and the first convex end of the grip is length-a 601; while the distance between the concave end of the second moving-cap 12 and the second convex end of the grip 14 is length-b 602. Further, length-d1 603=length-a 601+length-d3 605+length-d5 607. Length-d2 604=length-b 602+length-d4 606+length-d6 608. In one example, length-d5 607=length-d6 608, in another example, length-d5 607 does not equal length-d6 608. Length-d3 605>=0. Length-d4 606>=0. In an example, if length-d1 603=length-d2 604, then the above equations may be simplified as: length-a 601+length-d3 605+length-d5 607=length-b 602+length-d4 606+length-d6 608. Further, assuming length-d5 607=length-d6 608, the equation is simplified as: length-a 601+length-d3 605=length-b 602+length-d4 606. In our example, the first connector 11 is longer than the second connector 12. Therefore, length-a 601−length-b 602=length-d4 606−length-d3 605. The length of the inner body 13 excluding the two connectors 11, 12 is: length-d1 603+length-d2 604=length-a 601+length-d3 605+length-d5 607+length-b 602+length-d4 606+length-d6 608=length-a 601+length-d3 605+length-d5 607+length-b 602+length-d3 605+length-a 601−length-b 602+length-d6 608=2*(length-a 601+length-d3 605)+(length-d5 607+length-d6 608). In an example, if the length-d3 605 is close to 0, and (length-d5 607+length-d6 608)=the length of the grip in physical form. The minimal length of the inner body excluding the two connectors is: 2*length-a 601+length-grip 14.

FIG. 6B illustrates fully extending positions of the two connectors 17, 18, relative to the first moving-cap 11, second moving-cap 12, the grip 14, 140 (not shown), and the inner body 13. In this configuration, the grip 14, 140 (not shown)

is within the combined length-d1 603 and length-d2 604 of the first moving-cap 11 and second moving-cap 12.

Figure 7A:
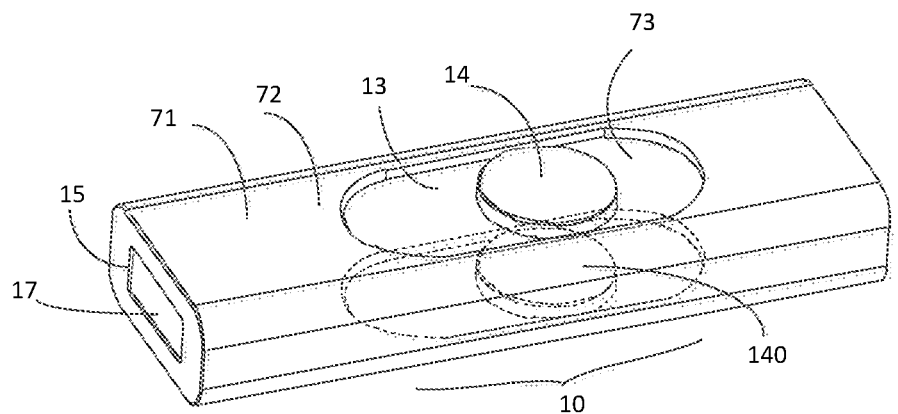
FIG. 7A shows an example of employing a single moving-cap of a dual-port data accessing device in a neutral position to retract both connectors.
Figure 7B:
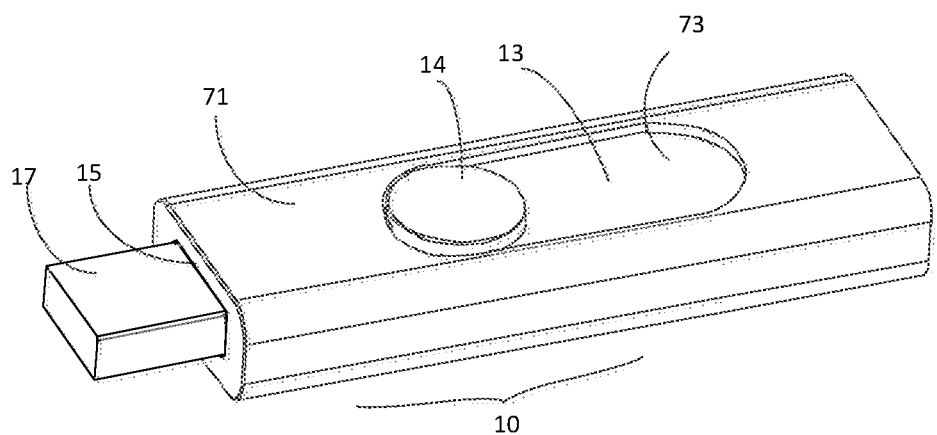
FIG. 7B shows an example of employing a single moving-cap of a dual-port data accessing device extending to the right side to extend the left-hand side connector and to retract the right-hand side connector.
Figure 7C:
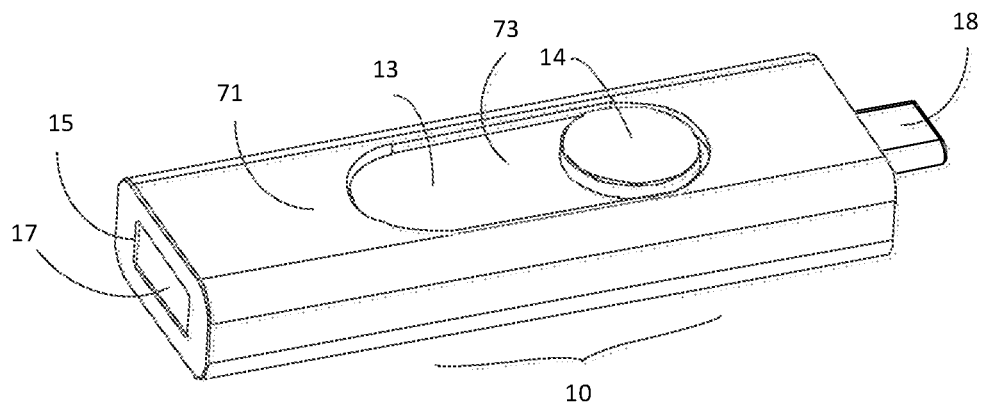
FIG. 7C shows an example of employing a single moving-cap of a dual-port data accessing device extending to the left side to extend the right-hand side connector and to retract the left-hand side connector.

FIGS. 7A-7C illustrates examples of the dual-port data accessing device 10, which includes an inner body 13, moving-cap 71, first connector 17, second connector 18, and two grips 14, 140 (not shown). Further, the dual-port data accessing device may include one or two locking/releasing mechanisms (not shown). The moving-cap 71 includes first connector opening 15 which corresponds to and aligns with the first connector 17, and second connector opening 16 (not shown) which corresponds to and aligns with the second connector 18. The moving-cap 71 also includes a grip opening 73 and 730 (not shown) in the top surface 72 and bottom surface 720 (not shown) of the moving-cap 71, respectively. The grip openings 73, 730 having a stadium shape which is a rectangular shape with a pair of semicircular shapes positioned at opposite ends. The grips 14, 140 may be in the expression of an action or in physical forms. The grips 14, 140 positions may be near or in the middle of the inner body 13 on a top and bottom side of the inner body 13. The grip openings 73, 730 surrounds grips 14, 140, respectively, but allows space for the moving-cap 71 to slide along the inner-body 13 into multiple positions as described below. The grips 14, 140 may also be in the form of a ridge, groove, button, or valley on the inner body 13, to assist the traction and the movement of the moving-caps. The grips 14, 140 (not shown) may also act as a stop for the moving-cap while sliding in either direction along the inner body as shown in FIGS. 7B and 7C.

As shown in FIG. 7A, the single moving-cap 71 remains in the middle neutral position to retract both first connector 17 and second connector 18. In the middle position neutral position as shown in FIG. 7A, the grips 14, 140 are also in a middle position of the grip openings 73, 730, respectively.

As shown in FIG. 7B, the single moving-cap 71 slides to the right side to extend the left-hand side first connector 17 and to retract the right-hand side second connector 18. Further, as shown in FIG. 7B, the grips 14, 140 (not shown) are at a left side of the grip openings 73, 730, respectively.

As shown in FIG. 7C, the single moving-cap 71 slides to the left side to extend the right-hand side second connector 18 and to retract the left-hand side first connector 17. Further, as shown in FIG. 7C, the grips 14, 140 (not shown) are at a right side of the grip openings 73, 730, respectively.

As shown in FIGS. 7A-7C, an example of the multi-port data accessing device 10 includes an inner body 13 including a first connector 17, a second connector 18, grips 14, 140 (not shown), and a locking/releasing mechanism 500 (not shown); and a moving-cap 71 including a first connector opening 15 and a second connector opening 16 (not shown); wherein the moving-cap 71 is moveable along the inner body 13 in response to a pump-action with help of the grips 14, 140 to release and move the moving-cap 71 between a first position as shown in FIG. 7A, a second position as shown in FIG. 7B, and a third position as shown in FIG. 7C, the first position including the first connector 17 within the moving-cap 71 in an inactive/dormant state and the second connector 18 within the moving-cap 71 in an inactive/dormant state, the second position including the first connector 17 extended through the first connector opening 15 in an active/operation state and the second connector 18 within the moving-cap 71 in an inactive/dormant state, and the third position including the first connector 17 within the moving-cap 71 in an inactive/dormant state and the second connector 18 extended through the second connector opening 16 in an active/operation state; wherein the grip 14 and/or grip 140 assists traction and movement of the moving-cap 71; and wherein a locking/releasing mechanism 500 securely locks the moving-cap 71 of the multi-port data accessing device in one of the first position, second position, and third position.

Figure 8A:
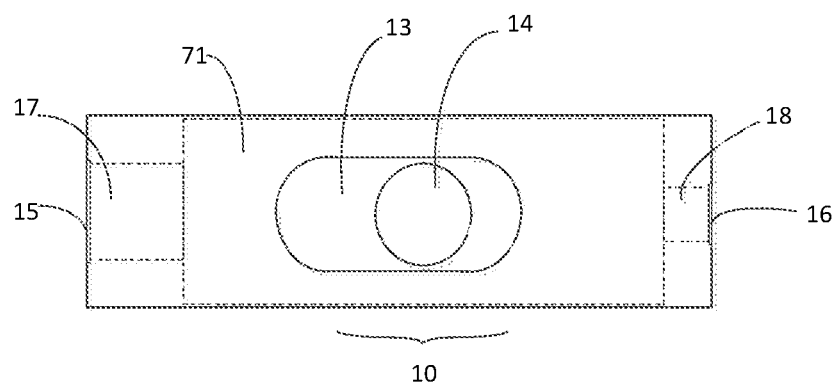
FIGS. 8A-8C shows plan views of the examples of FIGS. 7A-7C.
Figure 8B:
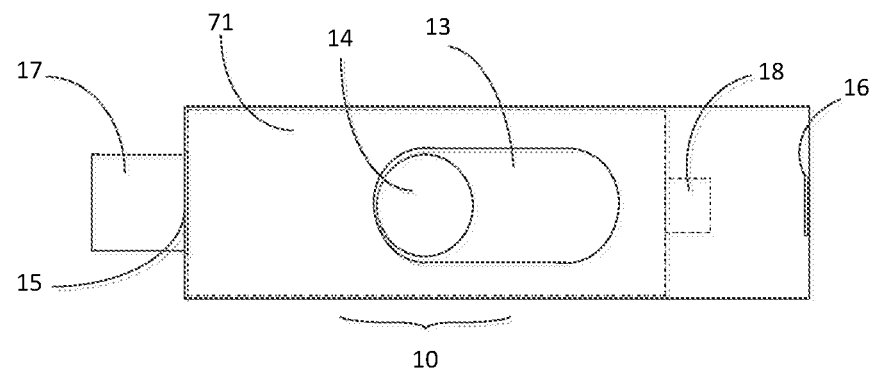
Figure 8C:
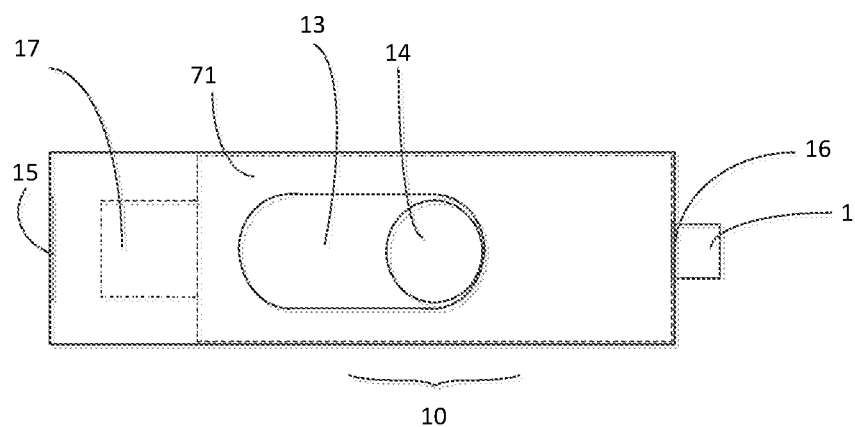

FIGS. 8A-8C shows the plan views of corresponding FIGS. 7A-7C of the three exemplary combinations of the first connector 17 and second connector 18 employing a single moving-cap 71 in use of a dual-port data accessing device 10.

As shown in FIG. 8A, the single moving-cap 71 remains in the middle neutral position to retract both first connector 17 and second connector 18 in retracting mode.

As shown in FIG. 8B, the single moving-cap 71 slides to the right side to extend the left-hand side first connector 17 and to retract the right-hand side second connector 18.

As shown in FIG. 8C, the single moving-cap 71 slides to the left side to extend the right-hand side second connector 18 and to retract the left-hand side first connector 17.

The locking mechanism of the corresponding moving-cap 71, securely locks itself within the data accessing device 10 in either the active/operation or inactive/dormant state of the corresponding first connector 17 and second connector 18. A pump-action force on the moving cap, can be applied with the help of the grip 14, 140 (not shown) to release itself and change the state of the corresponding first connector 17 and second connector 18, between active/operation and inactive/dormant.

The moving-cap 71, works with the assistance of the grip 14, 140 (not shown) on the data accessing device 10 for better traction. The grip position can be in the middle of the inner body 13.

In general, the locking mechanism as stated in FIGS. 5A-5C still applies, except that there may be different numbers of sinking holes 503, 507 and 509 (not shown) and guiding ramps 504, 506 and 510 (not shown).

A pump-action force on the moving-cap 71 can be applied with the help of the grip 14, 140 (not shown). The moving-cap 71 is therefore released from its locking position in one of the sinking holes 503, 507 or 509 (not shown) and slides with the help of the sliding rail 508, as in FIG. 5C, toward the alternate locking position in another sinking hole into the next state, between active and inactive state of the connectors.

If one of the first connector 17 or second connector 18 is intended to be in operation state, a pump-action inwards force on the moving-cap 71 can be applied with the help of the grip 14, 140 (not shown). The moving-cap 71 is therefore released from its locking position in one of the sinking holes 503, 507 or 509 (not shown) and slides with the help of the sliding rail 508, as in FIG. 5C, toward the alternate locking position in another sinking hole 503, 507 and 509 (not shown) into the next operation state, which extends one of the first connector 17 or second connector 18 and retracts another opposite first connector 17 or second connector 18.

If both first connector 17 and second connector 18, are intended to be in inactive/dormant state, a pump-action outwards force on the moving-cap 71, can be applied with the help of the grip 14, 140 (not shown). The moving-cap 71, is therefore released from its locking position in one of the sinking holes 503, 507, or 509 (not shown), and slides with the help of the sliding rail 508, guiding ramps, 504, 506, and 510 (not shown) and guiding track 505, as in FIG. 5C, toward the alternate locking position in one of the sinking holes 503, 507, or 509 (not shown), into the next neutral and inactive/dormant state, which retracts both first connector 17 and second connector 18.

A sliding rib 501 and a locking rib 502, as shown in FIG. 5B, incorporate inside the moving-cap 71.

A sliding rail 508, sinking holes 503, 507 and 509 (not shown), and guiding ramps 504, 506 and 510 (not shown), as shown in FIG. 5C, corresponding to the moving-cap 71, incorporate on the side of the inner body 13.

The sliding rib 501 and the locking rib 502 on the moving-cap 71, mate with the sliding rail 508 and the sinking holes 503, 507 and 509 (not shown) on the inner body 13. The locking rib 502 and the sinking holes 503, 507 and 509 (not shown) contribute to the locking or secure state of the alternate position between the active/operation and the inactive/dormant states of the first connector 17 or second connector 18.

In order to release the moving-cap 71, from its secure/locking positions in one of the sinking holes 503, 507 or 509 (not shown), the pump-action force, the grip 14, 140 (not shown) and one of the guiding ramps 504, 506 or 510 (not shown) are required, as shown in FIG. 5A and FIG. 5D.

Although the present invention has been described in accordance with the examples and/or embodiments shown, one of ordinary skill in the art will readily recognize that there could be variations to the examples and embodiments and those variations would be within the spirit and scope of the present invention. Further, it is within the possession of one of ordinary skill in the art to combine various features of the examples and embodiments. Accordingly, many modifications may be made by one of ordinary skill in the art without departing from the spirit and scope of the appended claims and present invention.

The invention claimed is:

1. A multi-port data accessing device, comprising:
an inner body including a first connector, a second connector, a first grip, a second grip, and a locking/releasing mechanism, wherein the locking/releasing mechanism includes a plurality of sinking holes and a sliding rail; and
a moving-cap including a first connector opening and a second connector opening;
wherein the moving-cap is moveable along the inner body with help of the grip to release and move the moving-cap between a first position, a second position, and a third position,
the first position including the first connector within the moving-cap in an inactive/dormant state and the second connector within the moving-cap in an inactive/dormant state,
the second position including the first connector extended through the first connector opening in an active/operation state and the second connector within the moving-cap in an inactive/dormant state, and
the third position including the first connector within the moving-cap in an inactive/dormant state and the second connector extended through the second connector opening in an active/operation state;
wherein the first grip and the second grip assist traction and movement of the moving-cap;
wherein the locking/releasing mechanism securely locks the moving-cap of the multi-port data accessing device in one of the first position, second position, and third position;
wherein the first grip and the second grip are on opposite sides on top and bottom sides of the inner body; and
wherein the first grip and the second grip protrude from the top and bottom sides of the inner body and acts as a stop for the moving-cap sliding along the inner body.

2. The multi-port data accessing device of claim 1, wherein a position of the first and second grips in an expression of an action includes a substantially middle location of the inner body or on a non-operational moving-cap.

3. The multi-port data accessing device of claim 1, wherein the first and second grips in a physical form includes at least one of: a ridge, groove, button, or valley on the inner body or on the moving-caps.

4. The multi-port data accessing device of claim 1, wherein the moving-cap is released from a locking position in one of the plurality of sinking holes by sliding the moving-cap via the sliding rail toward an alternate locking position in another of the plurality of sinking holes into a next state between active and inactive state of the corresponding connector.

5. The multi-port data accessing device of claim 1, wherein one of the first and second connectors is positioned in an active state by a sliding force on the moving-cap towards to grip to release the moving-cap from a locking position in one of the plurality of sinking holes and slides via the sliding rail toward an alternate locking position in another of the plurality of sinking holes into a next operation state, which extends the corresponding connector through the corresponding connector opening.

6. The multi-port data accessing device of claim 1, wherein one of the first and second connectors is positioned in an inactive/dormant state by a sliding force on the moving-cap away from the grip to release the moving-cap from a locking position in one of the plurality of sinking holes and slides via the sliding rail toward an alternate locking position in another of the plurality of sinking holes into a next inactive/dormant state, which retracts the corresponding connector through the corresponding connector opening.

7. The multi-port data accessing device of claim 1, wherein a set of a sliding rib, a locking rib, the sliding rail, the sinking hole, guiding ramp, and guiding track incorporates on the moving-cap and the inner body to mate and form locking, releasing and sliding mode during the changing of the active or inactive state of the corresponding connector.

8. The multi-port data accessing device of claim 1, wherein the moving-cap further includes a sliding rib and a locking rib provided on an inner surface of the moving cap.

9. The multi-port data accessing device of claim 1, wherein the sliding rib and the locking rib
provided on the inner surface of the moving-cap corresponds with the sliding rail and one of the plurality of the sinking holes, respectively, when in a removably engaged locked position.

10. The multi-port data accessing device of claim 1, wherein the locking rib and the plurality of sinking holes, when removably engaged, contribute to a locking or secure state of the alternate position between the active/operation and the inactive/dormant states of the first connector or the second connector.

* * * * *